United States Patent
Shropshire

(10) Patent No.: US 9,223,762 B2
(45) Date of Patent: Dec. 29, 2015

(54) ENCODING INFORMATION INTO TEXT FOR VISUAL REPRESENTATION

(75) Inventor: Benjamin Shropshire, Campbell, CA (US)

(73) Assignee: Google Inc., Mountain View, CA (US)

(*) Notice: Subject to any disclaimer, the term of this patent is extended or adjusted under 35 U.S.C. 154(b) by 436 days.

(21) Appl. No.: 13/595,968

(22) Filed: Aug. 27, 2012

(65) Prior Publication Data

US 2015/0205764 A1 Jul. 23, 2015

(51) Int. Cl.
*G06F 17/00* (2006.01)
*G06F 17/21* (2006.01)
*G06F 17/22* (2006.01)
*G06F 17/30* (2006.01)

(52) U.S. Cl.
CPC .......... *G06F 17/212* (2013.01); *G06F 17/2235* (2013.01); *G06F 17/30882* (2013.01); *G06F 17/30887* (2013.01)

(58) Field of Classification Search
CPC .... G06F 17/211; G06F 17/2235; G06F 17/24
USPC ......................................... 715/243, 256, 205
See application file for complete search history.

(56) References Cited

U.S. PATENT DOCUMENTS

| | | | | |
|---|---|---|---|---|
| 4,594,674 A * | 6/1986 | Boulia et al. | | 345/471 |
| 6,185,683 B1 * | 2/2001 | Ginter et al. | | 713/176 |
| 7,222,306 B2 * | 5/2007 | Kaasila et al. | | 715/801 |
| 7,558,830 B2 * | 7/2009 | Cama | | 709/206 |
| 7,650,340 B2 * | 1/2010 | Raman et al. | | 707/999.01 |
| 8,042,063 B1 * | 10/2011 | Lin-Hendel | | 715/838 |
| 2002/0007483 A1 * | 1/2002 | Lopez | | 717/3 |
| 2002/0048037 A1 * | 4/2002 | Carbone | | 358/1.14 |
| 2003/0030645 A1 * | 2/2003 | Ribak et al. | | 345/581 |
| 2004/0078333 A1 * | 4/2004 | Hilton et al. | | 705/45 |
| 2005/0246314 A1 * | 11/2005 | Eder | | 707/1 |
| 2007/0133072 A1 * | 6/2007 | Kalra | | 358/518 |
| 2008/0040653 A1 * | 2/2008 | Levine | | 715/205 |
| 2008/0104153 A1 * | 5/2008 | Hatch | | 708/142 |
| 2008/0109477 A1 * | 5/2008 | Lue | | 707/102 |
| 2008/0114599 A1 * | 5/2008 | Slotznick et al. | | 704/260 |
| 2008/0177782 A1 * | 7/2008 | Poston et al. | | 707/102 |
| 2009/0138799 A1 * | 5/2009 | Gottfurcht et al. | | 715/239 |
| 2009/0199230 A1 * | 8/2009 | Kumar et al. | | 725/32 |
| 2010/0180213 A1 * | 7/2010 | Karageorgos et al. | | 715/753 |

(Continued)

FOREIGN PATENT DOCUMENTS

WO     WO 2005116916 A1 * 12/2005

*Primary Examiner* — Laurie Ries
(74) *Attorney, Agent, or Firm* — McDermott Will & Emery LLP

(57) ABSTRACT

The disclosed subject matter relates to computer implemented methods for encoding information into text for visual representation. In one aspect, a method includes receiving a body of text which includes one or more portions of text. The method further includes receiving a body of information to be encoded. The body of information includes one or more portions of information to be encoded. The method further includes selecting at least one of the portions of text. The method further includes formatting the selected portion(s) of text to generate a formatted body of text. Formatting the selected portion(s) of text includes applying one or more formatting schemes to the selected portion(s) of text. Formatting schemes correspond to one or more portions of the information to be encoded. The method further includes providing the formatted body of text for visual representation.

21 Claims, 5 Drawing Sheets

(56) References Cited

U.S. PATENT DOCUMENTS

| | | | |
|---|---|---|---|
| 2010/0318894 A1* | 12/2010 | Billharz et al. | 715/234 |
| 2011/0040747 A1* | 2/2011 | Brad et al. | 707/722 |
| 2011/0184827 A1* | 7/2011 | Hubert | 705/26.1 |
| 2012/0042239 A1* | 2/2012 | O'Brien | 715/243 |
| 2012/0072821 A1* | 3/2012 | Bowling | 715/229 |
| 2012/0096344 A1* | 4/2012 | Ho et al. | 715/249 |
| 2013/0179771 A1* | 7/2013 | Dent et al. | 715/234 |

* cited by examiner

ENCODING INFORMATION INTO TEXT FOR VISUAL REPRESENTATION

BACKGROUND

Electronic documents (e.g., web pages, documents generated by a word processor) often contain information that can be easily accessed based on an action taken by a user. As an example, text within an electronic document can be marked up to include a link (e.g., a URL) referencing content at another location. A user viewing the electronic document can use a pointing device (e.g., a mouse) to click on the marked up text including the link, to access content at the location referenced by that link. As another example, a user can use the pointing device (e.g., a mouse) to hover over a link to view an infotip, often referred to as a tooltip.

SUMMARY

The disclosed subject matter relates to a computer-implemented method for encoding information into text for visual representation. The method includes receiving a body of text which includes one or more portions of text. The method further includes receiving a body of information to be encoded. The body of information includes one or more portions of information to be encoded. The method further includes selecting at least one of the portions of text. The method further includes formatting the selected portion(s) of text to generate a formatted body of text. Formatting the selected portion(s) of text includes applying one or more formatting schemes to the selected portion(s) of text. Formatting schemes correspond to one or more portions of the information to be encoded. The method further includes providing the formatted body of text for visual representation.

The disclosed subject matter further relates to a system for encoding information into text for visual representation. The system includes a memory which includes instructions for encoding information into text for visual representation, and a processor. The processor is configured to execute the instructions to receive a body of text which includes one or more portions of text. The processor is further configured to receive a body of information to be encoded. The body of information includes one or more portions of information to be encoded. The processor is further configured to select at least one of the portions of text. The processor is further configured to format the selected portion(s) of text to generate a formatted body of text. Formatting the selected portion(s) of text includes applying one or more formatting schemes to the selected portion(s) of text. Formatting schemes correspond to one or more portions of the information to be encoded. The processor is further configured to provide the formatted body of text for visual representation. The visual presentation can be printed matter.

The disclosed subject matter further relates to a machine-readable medium including machine-readable instructions for causing a processor to execute a method for encoding information into text for visual representation. The method includes receiving a body of text which includes one or more portions of text. The method further includes receiving a body of information to be encoded. The body of information includes one or more portions of information to be encoded. The method further includes selecting at least one of the portions of text. The method further includes formatting the selected portion(s) of text to generate a formatted body of text. Formatting the selected portion(s) of text includes applying one or more formatting schemes to the selected portion(s) of text. Formatting schemes correspond to one or more portions of the information to be encoded. The method further includes providing the formatted body of text for visual representation.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

Figure 1:
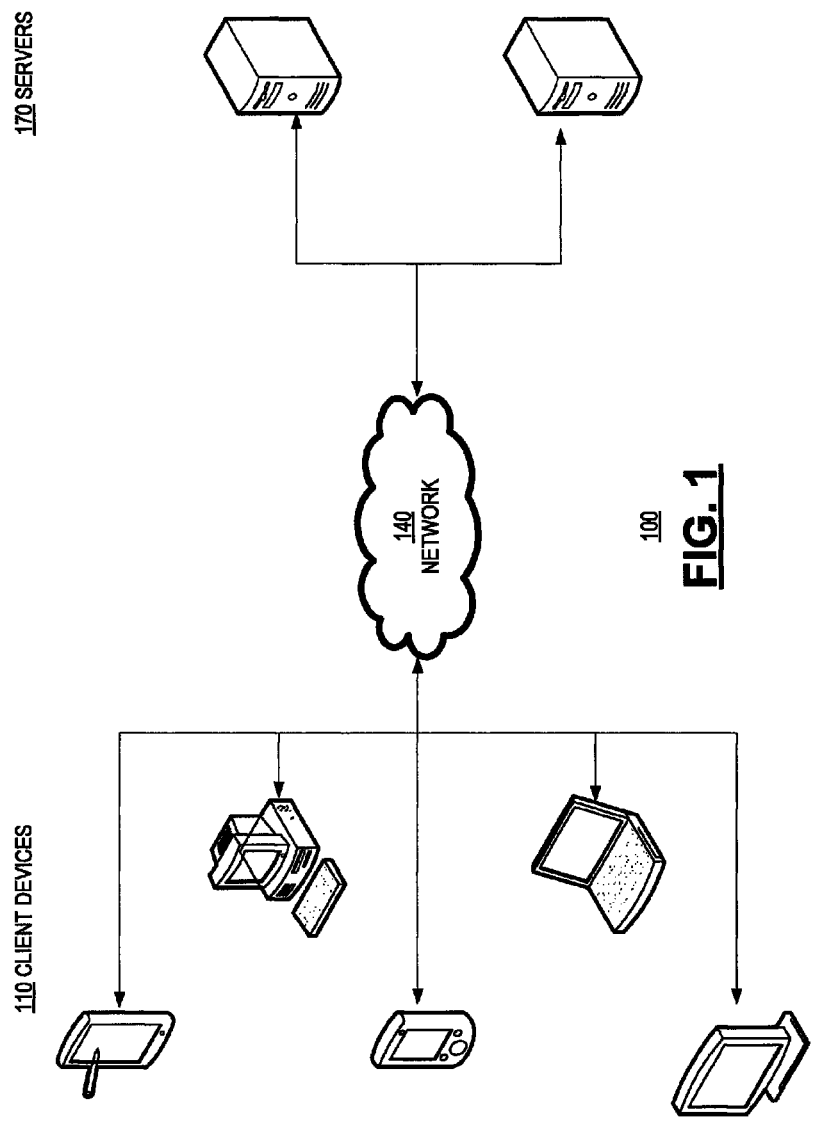
FIG. 1 illustrates an example of an architecture for encoding information into text for visual representation.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As described above, electronic documents (e.g., web pages, documents generated by a word processor) often contain information that can be easily accessed based on an action taken by a user. As an example, text within an electronic document can be marked up to include a link (e.g., a URL, a hyperlink, a file link) referencing content at another location. A user viewing the electronic document can use a pointing device (e.g., a mouse) to click on the marked up text including the link, to access content at the location referenced by that link. As another example, a user can use the pointing device (e.g., a mouse) to hover over a link to view an infotip, often referred to as a tooltip.

Thus, marked up text can be a convenient means of providing additional information that can readily be accessed by a reader. This information is lost when the electronic document is printed. For example, when a web page containing marked up text including links is printed, a user viewing the printed matter can no longer discern the target URL of the link from the marked up text.

This document describes systems and techniques for encoding information into text for visual representation. It should be noted that the systems and techniques described herein are not limited to encoding information (e.g., a hyperlink, an infotip) that is typically lost when an electronic document is printed. The systems and techniques described herein can be used to encode any type of information into text. For example, copyright information, contact information, publishing dates, docket numbers, ISBN numbers, employee ID numbers, and so on can be encoded into text.

Existing approaches to encoding information include barcodes and Quick Response Codes ("QR Codes"), which are represented as images. Because a certain amount of area (e.g., a square or rectangular shaped area) is required to print an image, barcodes and QR Codes are typically placed away from those sections of printed matter that contain text. Because of the physical separation of the text and a barcode/QR Code, it would be cumbersome to determine which barcode/QR Code corresponds to a particular portion of text. Furthermore, because each barcode/QR Code requires its own image, the amount of space required to include such images would increase in proportion to the amount of information to be encoded.

Therefore, it would be desirable to be able to encode information into text, because such an approach would not require a separate space for an image including encoded information.

FIG. 1 illustrates an example of an architecture 100 for encoding information into text for visual representation. The architecture 100 includes client devices 110 and servers 170 connected over a network 140.

The client devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory. Each client device 110 is configured to include an input device for accepting user input, and an output device to display information to the user.

The client devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

Figure 2:
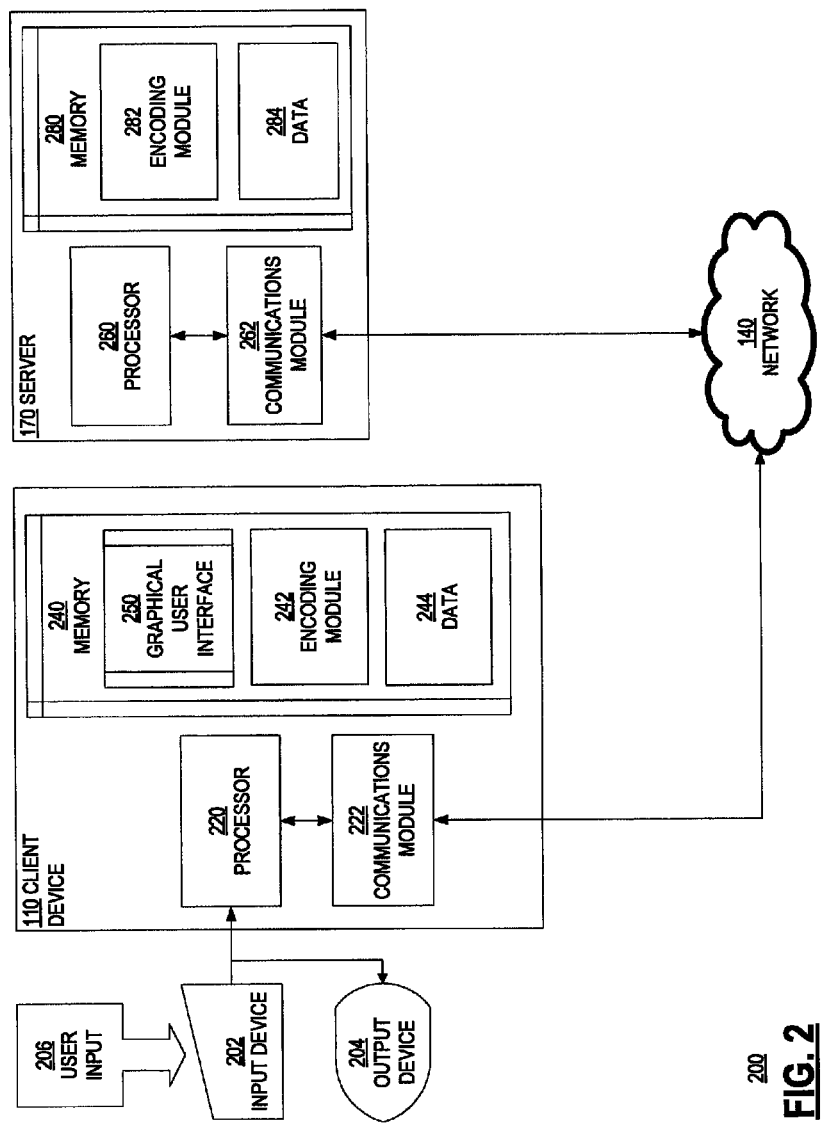
FIG. 2 is a block diagram illustrating an example of a client device and a server from the architecture of FIG. 1.

FIG. 2 is a block diagram 200 illustrating an example of a client device 110 and a server 170 in the architecture 100 of FIG. 1 according to certain aspects of the disclosure.

The client device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client device 110. The output device 204 can be a display screen. Input 206 received via the input device 202 can be processed locally on the client device 110 and/or the server 170.

The client device 110 can be connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which allows a user to interact with the computing device 110 and/or the server 170, and can be used to display information to the user. The graphical user interface 250 may be installed locally at the computing device 110 and/or downloaded from the server 170.

The memory 240 further includes software instructions that can be read by the processor 220 to implement an encoding module 242. Data generated and/or stored by the encoding module 242 can be stored as encoding data 244. The encoding module 242 includes software instructions for receiving a body of text which includes one or more portions of text. The encoding module 242 further includes software instructions for receiving a body of information to be encoded. The body of information includes one or more portions of information to be encoded. The encoding module 242 further includes software instructions for selecting at least one of the portions of text. The encoding module 242 further includes software instructions for formatting the selected portion(s) of text to generate a formatted body of text. Formatting the selected portion(s) of text includes applying one or more formatting schemes to the selected portion(s) of text. Formatting schemes correspond to one or more portions of the information to be encoded. The encoding module 242 further includes software instructions for providing the formatted body of text for visual representation.

The processor 220 of the client device 110 is configured to execute instructions, such as instructions physically coded into the processor 220, instructions read from the memory 240, or a combination of both. As an example, based on the instructions read from the memory 240, the processor can be configured to execute a method for encoding information into text for visual representation.

Once the instructions from the memory 240 are loaded, the processor 220 is configured to receive a body of text which includes one or more portions of text. The processor 220 is further configured to receive a body of text which includes one or more portions of text. The processor 220 is further configured to receive a body of information to be encoded. The body of information includes one or more portions of information to be encoded. The processor 220 is further configured to select at least one of the portions of text. The processor 220 is further configured to format the selected portion(s) of text to generate a formatted body of text. Formatting the selected portion(s) of text includes applying one or more formatting schemes to the selected portion(s) of text. Formatting schemes correspond to one or more portions of the information to be encoded. The processor 220 is further configured to provide the formatted body of text for visual representation.

The server 170 includes a memory 280, a processor 260, and a communications module 262. The memory 280 includes software instructions that can be read by the processor 260 to implement an encoding module 282. The encoding module 282 includes software instructions for receiving a body of text which includes one or more portions of text. The encoding module 282 further includes software instructions for receiving a body of information to be encoded. The body of information includes one or more portions of information to be encoded. The encoding module 282 further includes software instructions for selecting at least one of the portions of text. The encoding module 282 further includes software instructions for formatting the selected portion(s) of text to generate a formatted body of text. Formatting the selected portion(s) of text includes applying one or more formatting schemes to the selected portion(s) of text. Formatting schemes correspond to one or more portions of the information to be encoded. The encoding module 282 further includes software instructions for providing the formatted body of text for visual representation.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions received from the memory 280, or a combination of both. As an example, the processor 260 of the server 170 executes instructions for encoding information into text for visual representation.

Once the instructions from the memory 280 are loaded, the processor 260 is configured to receive a body of text which includes one or more portions of text. The processor 260 is further configured to receive a body of text which includes one or more portions of text. The processor 260 is further configured to receive a body of information to be encoded. The body of information includes one or more portions of information to be encoded. The processor 260 is further configured to select at least one of the portions of text. The processor 260 is further configured to format the selected portion(s) of text to generate a formatted body of text. Formatting the selected portion(s) of text includes applying one or more formatting schemes to the selected portion(s) of text. Formatting schemes correspond to one or more portions of the information to be encoded. The processor 260 is further configured to provide the formatted body of text for visual representation.

Figure 3:
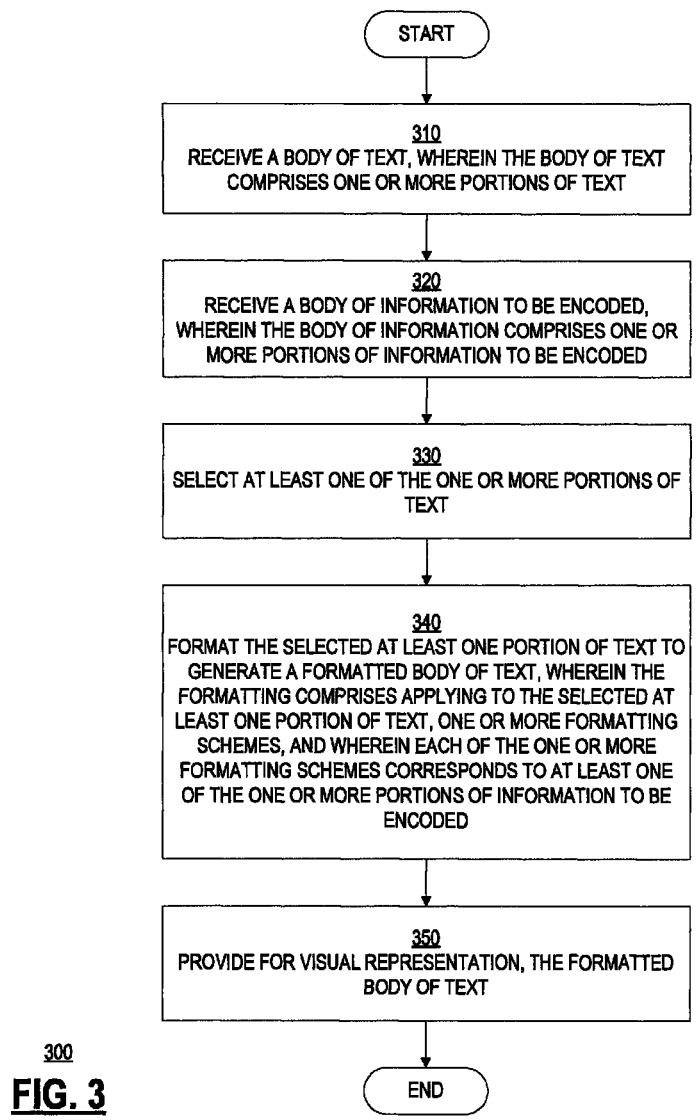
FIG. 3 illustrates an example of a process for encoding information into text for visual representation.

FIG. 3 illustrates an example of a process 300 for encoding information into text for visual representation. It should be noted that although process 300 is described herein with reference to the systems of FIGS. 1 and 2, process 300 is not limited to such, and can be performed by other systems and/or configurations. For example, the process 300 can be performed entirely by a client device 110, a server 170, or a combination of both.

In step 310, a computing device receives a body of text which includes one or more portions of text. The computing device can be a client device 110, a server 170, or a combination of both. It should be noted that while references are made to a computing device (e.g., 110, 170), the various steps of the process 300 may be performed by software (e.g., a print driver, an operating system, an application). The body of text can include one or more characters that e.g., one or more characters (e.g., letters, numbers, symbols), words, sentences, paragraphs, and so on. That is, the portions of text can be a single character (e.g., a letter, a number, a symbol), a word, a sentence, a paragraph, and so on. The received body of text can be stored e.g., as data (e.g., 244, 284) in the memory (e.g., 240, 280) of the computing device (e.g., 110, 170).

In step 320, the computing device (e.g., 110, 170) receives a body of information to be encoded. The body of information includes one or more portions of information to be encoded. The body of information can include any one or more types of information. For example, the body of information can include characters (e.g., letters, numbers, symbols), binary data, and so on. As one example, the body of information can include a telephone number. As another example, the body of information can include an email address which includes letters, numbers, and an "@" symbol. The received body of information can be stored e.g., as data (e.g., 244, 284) in the memory (e.g., 240, 280) of the computing device (e.g., 110, 170).

In step 330, the computing device (e.g., 110, 170) selects at least one of the portions of text. Portion(s) of text can be selected based on a predefined relationship. For example, in a hyperlink, the text of the hyperlink is related to the URL of the hyperlink. As another example of a predefined relationship, the text of an email address is related to the mailto link of the email address.

In some instances, such a predefined relationship may not provide sufficient portion(s) of text to encode the body of information therein. For example, a single letter may be hyperlinked to a long URL. In such a case, the information can be encoded in a variety of ways. As an example, additional text in immediately adjacent locations may be selected. That is, additional portion(s) of text may be selected. As another example, a lookup service (e.g., a URL shortening service) may be used.

In step 340, the computing device (e.g., 110, 170) formats the selected portion(s) of text by applying various formatting schemes, corresponding to one or more of the portions of information to be encoded. The phrase "formatting scheme" as used herein encompasses its plain and ordinary meaning, including, but not limited to a style that is visually distinct from other portions of text within the body of text, to which the formatting scheme has not been applied. The formatting scheme can be an alteration in the visual appearance of the selected portion(s) of text, and/or an alteration in the locations immediately adjacent to the selected portion(s) of text.

Examples of alterations in the visual appearance include alterations in the spacing, the font, the case, the size, the kerning, the serifs, the shading of portions, the slanting, the underlining, the bolding, and/or the italicization of the selected portion(s) of text. Examples of alterations in the locations immediately adjacent to the selected portion(s) of text include adding a shading (e.g., a shadow), filling (e.g., filling in one or both of the closed shapes forming the letter B), adding markings (e.g., a watermark, dots), and/or removing markings (e.g., removing sections out of edges in a font resulting in non-uniform edges).

Underlining can also be used to include encoded information. For example, the underline can consist of several line segments of varying lengths. The line segments can be of varying width (e.g., line weight). As another example, underlining can include small text or markings.

In step 350, the computing device (e.g., 110, 170) provides the formatted body of text for visual representation. The formatted body can of text can be provided for visual representation in a number of ways.

For example, in providing for visual presentation, the computing device (e.g., 110, 170) may transfer the formatted body of text to another computing device (e.g., 110, 170) for visual representation. For example, a server 170 may transfer the formatted text to a client device 110.

As another example, in providing for visual representation, the computing device (e.g., 110, 170) may transfer the formatted body of text from one location (e.g., in memory) or module (e.g., encoding module) to another within itself. For example, a computing device (e.g., 110, 170) may transfer the formatted body of text from the encoding module (e.g., 242, 282) to another module for storage and/or additional processing.

As another example, providing for visual representation can include converting the formatted body of text into a printing language. Converting the formatted body of text into a printing language is one example of additional processing. Another example of additional processing can include processing involved in providing the formatted body of text to an output device.

The output device (e.g., 204) can be directly linked to the computing device (e.g., 110), or operatively linked (e.g., via a network 140) to the computing device (e.g., 170). The output device (e.g., 204) can be a display. The output device (e.g., 204) can be a printing device (e.g., a printer) configured to output the formatted body of text as printed matter.

The printed matter output by the output device (e.g., printer) is visually perceivable by a computing device (e.g., 110, 170) configured to decode the encoded information. That is the formatted body of text that is output as printed matter is visually perceivable by a computing device (e.g., 110, 170) configured to decode the information encoded into the formatted body of text.

The computing device (e.g., 110, 170) maybe configured to perform additional processing after the encoded information is decoded. For example, if the encoded information contains an executable instruction, the computing device (e.g., 110, 170) may be configured to execute that executable instruction. As an example, a user attending a conference at a convention center may be considered. The user wishes to connect his tablet computer to a wireless Wi-Fi network. The user's registration materials for the conference, include a printed card containing instructions on how to connect a computing device (e.g., a tablet computer) to the Wi-Fi network at the convention center. The text of the printed card includes executable commands encoded therein. Using the camera on the tablet computer, the user takes a picture of the printed card. Based on the executable instructions encoded in the text, the tablet computer is configured to be able to connect to the Wi-Fi network.

Configuration of devices based on information encoded in printed matter can be useful in many such scenarios. However, device configuration is only one example of an application of using encoded information to execute commands. As another example, a computing device (e.g., 110, 170) may be configured to perform an action commonly performed on the type of information included in the encoded information. For example, if the encoded information includes an email address (e.g., including a "mailto" reference), the computing device (e.g., 110, 170) may launch an email application (e.g., to send an email message to the referenced email address). Similarly, if the encoded information includes a URL (e.g., including an "http" reference), the computing device (e.g., 110, 170) may launch an Internet browser (e.g., to display the location referenced in the URL).

Figure 4:
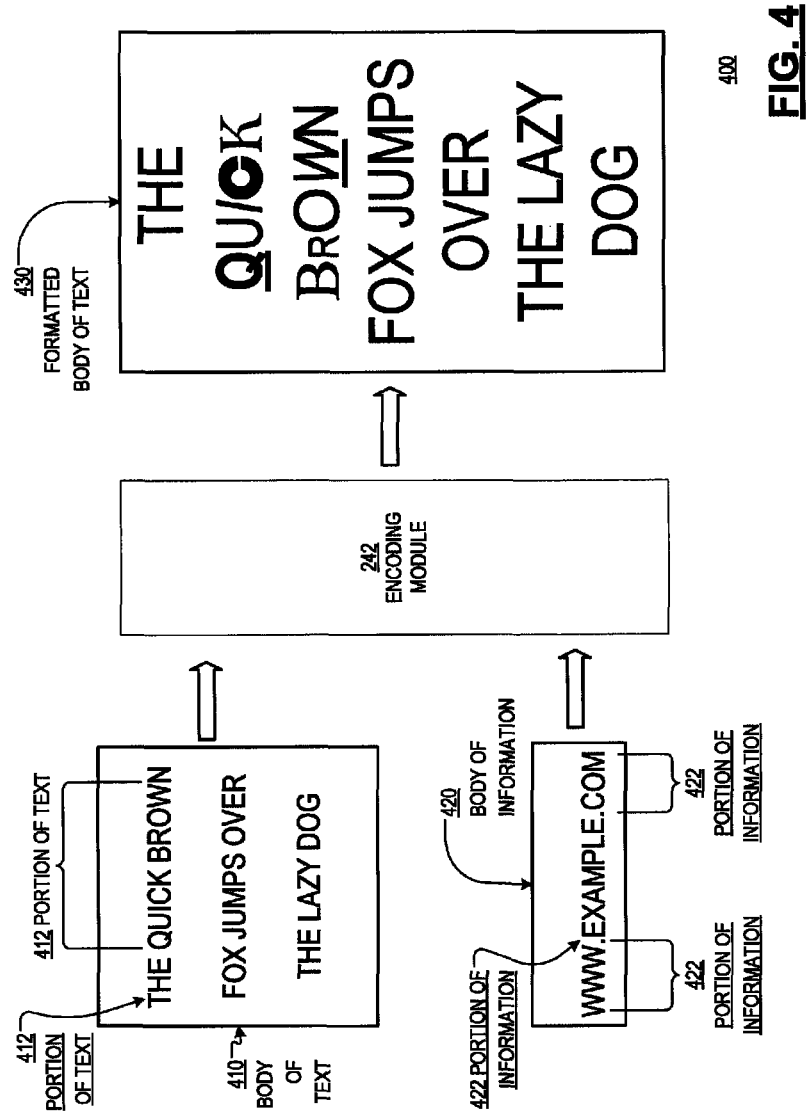
FIG. 4 is an illustration of an example of a system associated with the example of the process of FIG. 3.

An example will now be provided using the example of the process 300 of FIG. 3. In this example, illustrated in FIG. 4, a sentence 410 will be used as the body of text, a URL 420 (www.example.com) will be used as a body of information, and a desktop computer 110 will be used as a computing device.

In this example, a marketing consultant is designing print advertising for his client "Pangram International Café." Pangram International Café is a restaurant that features cuisine from a different country each day, cycling alphabetically through all the countries of the world.

The marketing consultant decides to design the print advertising for the restaurant as a play on the word "pangram," a phrase containing all the letters of the English alphabet. The print advertisement will be featured on the back cover of a gastronomy magazine focused on healthy eating. To focus on the health and fitness aspects of the food, the marketing consultant selects the pangram "The Quick Brown Fox Jumps Over The Lazy Dog."

The marketing consultant associates the URL for the restaurant's website, www.example.com, with the words "Quick Brown" in the sentence. The marketing consultant then invokes the encoding process on the desktop computer 110 to encode the URL into the sentence.

In step 310, the encoding module 242 on the desktop computer 110 receives the advertisement containing the sentence 410, which in this example is the body of text. The sentence 410 contains several portions of text 412. For example, a portion of text can be a single letter (e.g., the letter "T"), a single word (e.g., "Quick,") or group of words (e.g., "Quick Brown").

In step 320, the encoding module 242 receives the URL 420, which in this example is the body of information to be encoded. The URL 420, www.example.com, contains several portions of information. For example, a portion of information can be a single character or letter (e.g., "E"), a single word or group of characters (e.g., "example,") or combinations of characters (e.g., "www." and ".com").

In step 330, the encoding module 242 selects the words "Quick Brown" as a portion of text 412.

In step 340, the encoding module 242 formats the selected words "Quick Brown" by applying various formatting schemes, corresponding to the various portions of the URL. For example, the encoding module 242 applies bold and underline formatting to the letter "Q" to signify "www." which is a prefix used in many URLs. Similarly, the encoding module applies italics and underline formatting to the letter "W" to signify ".com" which is a suffix corresponding to the "com" generic top-level domain ("gTLD").

The encoding module then applies various formatting schemes to the letters "U" through "O" in the words "Quick Brown." In this example, each of the letters "U," "B," "R," and "O," correspond to the characters "E," "X," "A," "M," "P," "L," and "E," which are portions 422 of the URL 420.

In step 350, the encoding module 242 provides the formatted body of text 430 for visual representation. In this example, the encoding module 242 provides the formatted body of text 430 as an electronic file. The process 300 then ends.

The encoded URL 420 can be decoded in several scenarios. One scenario can be considered by continuing the example of the print advertisement describe above. In this scenario, the marketing consultant emails the formatted body of text to the magazine publishers, who include it on the back cover of their magazine. When the magazine is published, a reader reading the magazine is intrigued by the advertisement on the back cover. Interested to know what the advertisement is related to, the reader uses a smartphone to capture an image of the advertisement.

An application on the reader's smartphone is configurable to decode the URL 420 encoded into the sentence, or forward the image to a server (e.g., 170) for decoding the URL 420. In this scenario, the reader has configured the application to decode the URL locally, without sending the image to a server (e.g., 170).

The application analyzes the formatted body of text 430 to decode the URL 420. Upon decoding the URL 420, the application launches a web browser on the smartphone to display the web page corresponding to the encoded URL 420. The web site for Pangram Café is displayed in the browser on reader's smartphone.

It should be noted that while in above example, the marketing consultant associates the URL with text, the association may be carried out automatically by the encoding module (242, 282) when the encoding process is invoked. As an example, in the case of an electronic document containing hyperlinked text, the underlying URL of the hyperlinked text can be associated automatically with the text of the hyperlinked text. Furthermore, in an instance where the text of the hyperlinked text is of a length insufficient to encode the URL, the encoding module (242, 282) may expand the selection to include additional surrounding text. The surrounding text may be contiguous with respect to the text associated with the URL, or may be non-contiguous. A URL shortening service may also be used to shorten the URL to be encoded into the text of the hyperlinked text.

Figure 5:
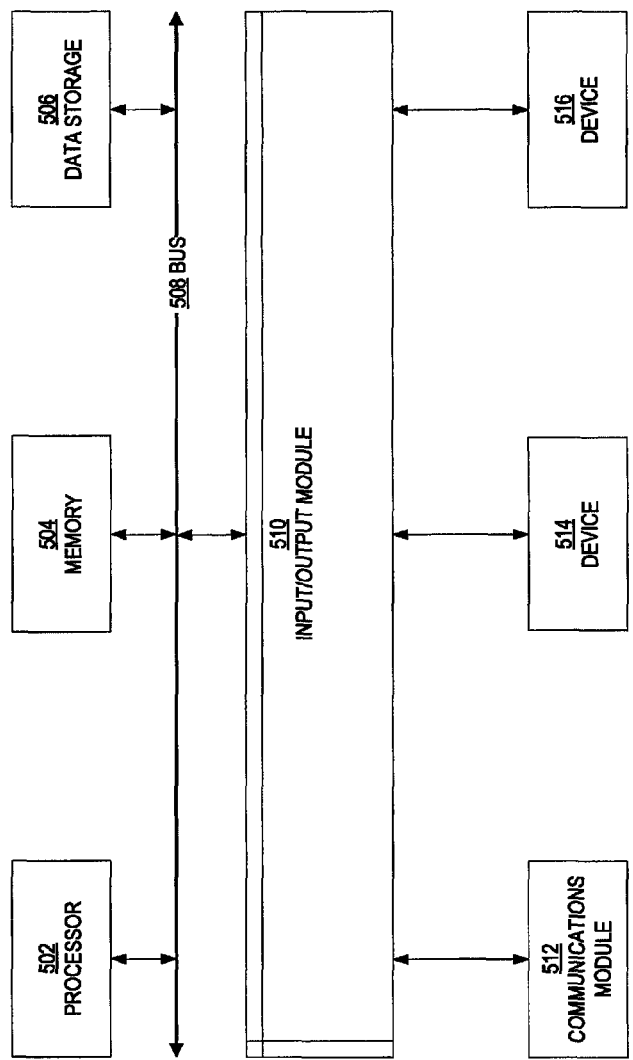
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk, optical disk, or solid state disk coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client devices and servers. A client device and server are generally remote from each other and typically interact through a communication network. The relationship of client device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for encoding information into text for visual representation, the method comprising:
   receiving a body of text, wherein the body of text comprises one or more portions of text;
   receiving a body of information to be encoded, wherein the body of information comprises one or more portions of non-formatting information to be encoded and is separate from the body of text;
   selecting at least one of the one or more portions of text;
   formatting the selected at least one portion of text to generate a formatted body of text, wherein the formatting comprises applying to the selected at least one portion of text, a plurality of formatting schemes, and wherein each of the plurality of formatting schemes corresponds to at least one of the one or more portions of non-formatting information to be encoded; and
   providing for visual representation, the formatted body of text.

2. The computer-implemented method of claim 1, wherein the selecting is based on a predefined relationship between the body of information and the selected at least one portion of text.

3. The computer-implemented method of claim 2, wherein the predefined relationship is a hyperlink, wherein the body of information to be encoded comprises a URL of the hyperlink, and wherein the selected at least one portion of text comprises a text of the hyperlink.

4. The computer-implemented method of claim 1, wherein the body of information to be encoded comprises a URL.

5. The computer-implemented method of claim 1, wherein the providing for visual representation comprises converting the formatted body of text into a printing language.

6. The computer-implemented method of claim 1, wherein the providing for visual representation comprises providing for output, the formatted body of text to an output device.

7. The computer-implemented method of claim 6, wherein the output device is a printing device configured to output as printed matter, the formatted body of text.

8. The computer-implemented method of claim 7, wherein the printed matter is visually perceivable by a computing device configured to decode the at least one of the one or more portions of non-formatting information to be encoded.

9. The computer-implemented method of claim 8, wherein the body of information comprises a URL, and wherein the computing device is configured to display content referenced by the URL.

10. The computer-implemented method of claim 8, wherein the body of information is an executable instruction, and wherein the computing device is configured to execute the executable instruction.

11. The computer-implemented method of claim 1, wherein applying the plurality of formatting schemes comprises alterations of at least two of: font, case, size, kerning, serif, slanting, underlining, bolding, or italicization of the selected at least one portion of text.

12. A system for encoding information into text for visual representation, the system comprising:
 a memory comprising instructions for encoding information into text for visual representation; and
 a processor configured to execute the instructions to:
  receive a body of text, wherein the body of text comprises one or more portions of text;
  receive a body of information to be encoded, wherein the body of information comprises one or more portions of non-formatting information to be encoded and is separate from the body of text;
  select at least one of the one or more portions of text;
  format the selected at least one portion of text to generate a formatted body of text, wherein the formatting comprises applying to the selected at least one portion of text, a plurality of formatting schemes, and wherein each of the plurality of formatting schemes corresponds to at least one of the one or more portions of non-formatting information to be encoded; and
  provide for visual representation, the formatted body of text, wherein the visual representation comprises printed matter.

13. The system of claim 12, wherein the body of information to be encoded comprises a URL.

14. The system of claim 12, wherein the step of providing for visual representation comprises converting the formatted body of text into a printing language.

15. The system of claim 12, wherein the providing for visual representation comprises providing the formatted body of text to a printing device configured to output the formatted body of text as the printed matter.

16. The system of claim 15, wherein the printed matter is visually perceivable by a computing device configured to decode the at least one of the one or more portions of non-formatting information to be encoded.

17. The system of claim 16, wherein the body of information comprises a URL, and wherein the computing device is configured to display content referenced by the URL.

18. The system of claim 16, wherein the body of information is an executable instruction, and wherein the computing device is configured to execute the executable instruction.

19. The system of claim 12, wherein the body of information is a URL associated with the selected portion of text.

20. The system of claim 12, wherein the selected at least one portion of text is of an amount proportional to an amount of the body of information to be encoded.

21. A non-transitory machine-readable storage medium comprising machine-readable instructions for causing a processor to execute a method for encoding information into text for visual representation, the method comprising:
 receiving a body of text, wherein the body of text comprises one or more portions of text;
 receiving a body of information to be encoded, wherein the body of information comprises one or more portions of non-formatting information to be encoded and is separate from the body of text;
 selecting at least one of the one or more portions of text;
 formatting the selected at least one of the portion of text to generate a formatted body of text, wherein the formatting comprises applying to the selected at least one portion of text, a plurality of formatting schemes, and wherein each of the plurality of formatting schemes corresponds to at least one of the one or more portions of non-formatting information to be encoded; and
 providing for visual representation, the formatted body of text.

* * * * *